Nov. 6, 1962

B. F. STEINBERGER 3,063,006

CIRCUIT CONTINUITY TESTER

Filed June 20, 1960

INVENTOR.
BERNARD F. STEINBERGER
BY
Buckhorn, Cheatham & Blore
ATTORNEYS

United States Patent Office 3,063,006
Patented Nov. 6, 1962

3,063,006
CIRCUIT CONTINUITY TESTER
Bernard F. Steinberger, 2615 E. 25th, Albany, Oreg.
Filed June 20, 1960, Ser. No. 37,161
3 Claims. (Cl. 324—51)

This invention relates to a circuit continuity tester and more particularly to a simple and inexpensive structure for testing electrical devices to determine whether a circuit in the device under test is continuous.

There has been a need for an inexpensive and effective circuit continuity tester which can be plugged into an ordinary electrical power outlet and which will give a reliable indication of the continuity of an electrical circuit while at the same time insuring that the user is not subjected to electrical shocks. Circuit continuity testers for plugging into standard electrical outlets so as to connect such testers to the usual 110 to 117 volt electric lines have been proposed but such testers have been awkward to use and have had exposed contacts capable of being sufficiently directly connected to the high potential or "hot" side of the line to deliver to the user an unpleasant if not dangerous shock.

In accordance with the present invention, a circuit continuity tester which can be plugged into the usual electrical outlets above described is provided and such tester has conveniently positioned contacts for testing such things as small lamps or fuses and also may be employed for other testing purposes. The tester is small in size and of simple and inexpensive construction but all exposed contacts are effectively isolated from the power line so that danger of shock is completely eliminated while at the same time a visual indication of the continuity is provided by a gas-filled electric discharge lamp connected in series with such line.

It is therefore an object of the present invention to provide an improved circuit continuity tester giving a visual indication of the continuity of a circuit in a device under test and directly connectable to a power line as source of power without danger of shocks to the user of the tester.

Another object of the invention is to provide a circuit continuity tester for electrical devices in which a gaseous discharge lamp is employed in a series circuit which can be connected across an alternating current power line and in which exposed contacts in such series circuit are effectively isolated from the power line.

A further object of the invention is to provide a circuit continuity tester of simple structure and of small physical dimensions particularly adaptable to testing electric lamps and fuses, but in which contacts are provided for testing lamps and fuses as well as other devices of substantially any size.

Other objects and advantages of the invention will appear in the following description of preferred embodiments, shown in the attached drawing of which:

Figure 1:
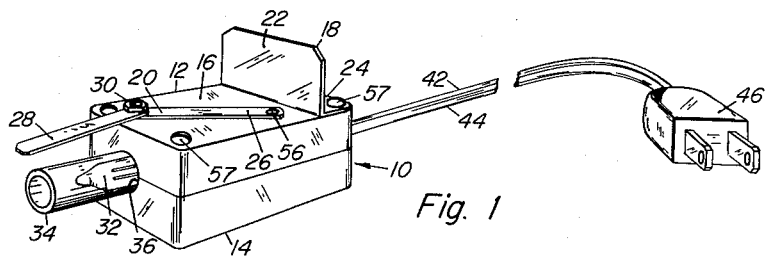
FIG. 1 is a perspective view of a circuit continuity tester in accordance with the present invention.
Figure 2:
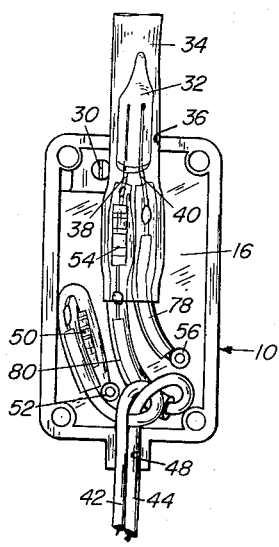
FIG. 2 is a bottom view of the device of FIG. 1 with the lower cover member of the casing thereof removed.

Referring more particularly to the drawings, the embodiment of the circuit continuity tester shown in FIGS. 1 and 2 may have a casing 10 including a hollow rectangular body member 12 forming the upper portion of the casing in the position shown in FIG. 1, and a hollow rectangular cover member 14 forming the lower portion of the casing in the position shown in FIG. 1.

The body member 12 has a top wall 16 providing an outer contact supporting surface. A pair of spaced contact members 18 and 20 are secured to the wall 16 in engagement with such surface. The contact member 18 is an angular member having an upstanding portion 22 extending laterally across the outer surface of the wall 16 and having a flange portion 24 secured to the wall 16. The contact member 20 is made up of two elongated elements 26 and 28 having their ends pivotally secured together and to the wall 16 at 30. The other end of the element 26 is also secured to the wall 16 and the element 28 may be folded about the pivot 30 from the extended position shown in FIG. 1 to an angular position between such extended position and a folded position substantially parallel to the element 26.

As shown most clearly in FIG. 2, a small sized gaseous commercially available discharge lamp 32, such as a neon lamp, may be assembled in a tubular member 34 of flexible transparent material and the resulting assembly may be positioned so as to hold the lamp 32 in position in an aperture 36 formed partly in an end wall of the body member 12 and an end wall of the cover member 14. The lamp 32 thus has its connections 38 and 40 positioned within the casing 10 and a portion of its bulb projecting through a wall of the casing so as to be visible from the exterior of such casing.

The tester of FIGS. 1 and 2 includes a connection cord having conductors 42 and 44 terminating in a standard plug 46, which conductors enter the casing 10 through another aperture 48 formed partly in the other end walls of the body member 12 and cover member 14. One of the conductors 42 is connected to one end of a current limiting resistor 50 which has its other end connected to the contact member 18 through a connector element 52 shown in FIG. 2. It will be understood that the connector element 52 extends through the wall 16 of the body member 12 and into electrical contact with the contact member 18. The other conductor 44 is connected to one end of a current limiting resistor 54 having its other end connected to one of the connectors 38 of the lamp 32. The other connector 40 of the lamp 32 is connected through a connector element 56 to the other contact member 20. The body member 12 and cover member 14 are secured together by suitable fastening means, such as the rivets 57.

The circuit described above is such that there is a resistor 50 or 54 in series with each of the conductors 42 and 44 connecting the device to a power line when the device is in operation so that all portions of the tester including the contact members 18 and 20 are isolated from the power line by such resistors. Thus there is such a resistor between each of the sides of the power line and each of the exposed contacts 18 and 20. With conventional commercially obtainable small size gaseous discharge lamps, for example, neon lamps, such resistors may be of sufficiently high resistance, for example 220,-000 ohms, that all exposed conductors of the device are effectively isolated from the power line. A connection between the contact members 18 and 20 will cause the lamp 32 to light even though the current through the series circuit is measured in microamperes and even though no shock can be felt when both contact members 18 and 20 are engaged by portions of the body of the user of the device.

Figure 3:
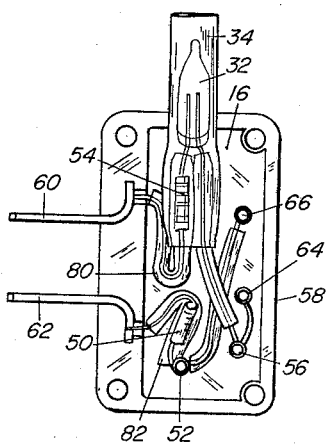
FIG. 3 is a view similar to FIG. 2 of a modified device.

The modification of FIG. 3 is similar to that of FIGS. 1 and 2 except that a modified body member 58 is employed and such body member has plug contact elements 60 and 62 secured directly therein for making electrical connection to a power line rather than employing a connection cord having the conductors 42 and 44 and plug 46 of FIG. 1. Otherwise the circuit of the modification of FIG. 3 is the same except that pin jacks 64 and 66 extending through the wall 16 of the body member 58 are shown as being connected in parallel with the contact members 18 and 20 so that, if desired, conventional leads (not shown) having pin terminals can be employed for testing circuits which cannot be brought into contact with the contact members 18 and 20. That is to say, the circuit of the tester of FIG. 3 may include the lamp 32, the resistors 50 and 54 and the connectors 52 and 56. Again the resistors 50 and 54 isolate all portions of the device from the plug contact elements 60 and 62 which are employed to connect the device to the power line.

Figure 4:
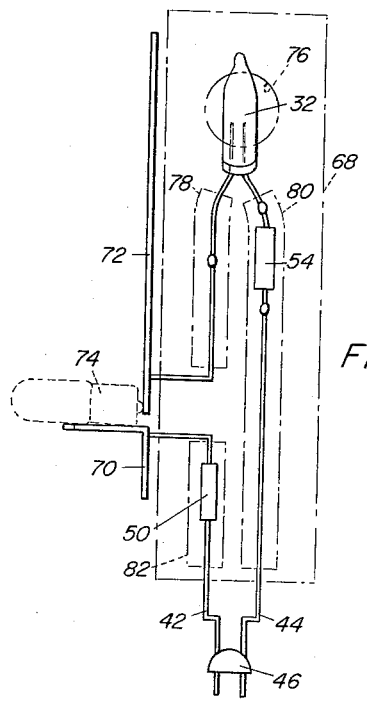
FIG. 4 is a diagrammatic showing the circuit employed in the testers of the present invention illustrated in further modified structure.

A further modified device is shown diagrammatically in FIG. 4 including a casing 68 shown in dash-dot lines and a pair of external contacts 70 and 72. A small electric lamp 74 is shown in testing position in FIG. 4 on the contacts 70 and 72 and it will be apparent that larger lamps or either screw type fuses or cartridge type fuses may be tested by placing them in proper position upon the contacts 70 and 72. The gaseous discharge lamp 32 is shown as being completely enclosed in the casing 68 and as being visible from the exterior of such casing 68 through an aperture 76 also indicated in dash-dot line. Again the circuit contains resistors 50 and 54 isolating any exposed conducting portion of the tester including the contacts 70 and 72 from the conductors 42 and 44 which can be connected to the power line.

While the various elements within the casings of the device have been shown as insulated from each other by insulating elements such as the sleeves 78, 80 and 82, it is apparent that such insulating elements may be omitted and the entire casing of the device filled with any of a number of well known "potting" materials. In any case, the resulting structure is an effective and easy to use but entirely safe continuity tester of small size and simple construction capable of being connected to receive its energization from a power line. The current requirements of the tester are sufficiently small that damage to devices being tested is prevented.

I claim:

1. A continuity tester for electrical devices having spaced terminal elements, which tester comprises, a casing of insulating material, a gaseous discharge lamp at least partly positioned in said casing and visible from the exterior of said casing, a pair of spaced contacts secured to an exterior surface of said casing for engagement with said terminal elements, means associated with said casing for connecting said contacts and said lamp in series circuit with an electrical power line, said series circuit including a first current limiting resistor in series between one side of said power line and one of said contacts and a second current limiting resistor in series between the other side of said power line and the other of said contacts, said contacts being the only exposed portion of said series circuit, one of said contacts having an upstanding portion extending substantially perpendicular to said surface of said casing and the other of said contacts extending along said surface from a point adjacent but spaced from said one contact.

2. A continuity tester for electrical devices having spaced terminal elements, which tester comprises, a casing of insulating material, a gaseous discharge lamp at least partly positioned in said casing and visible from the exterior of said casing, a pair of spaced contacts secured to an exterior of said surface of said casing for engagement with said terminal elements, means associated with said casing for connecting said contacts and said lamp in series circuit with an electrical power line, said series circuit including a first current limiting resistor in series between one side of said power line and one of said contacts and a second current limiting resistor in series between the other side of said power line and the other of said contacts, said contacts being the only exposed portion of said series circuit, one of said contacts having an upstanding portion extending substantially perpendicular to said surface of said casing and the other of said contacts extending along said surface from a point adjacent but spaced from said one contact, said other contact including a stationary portion rigidly secured to said surface and an elongated portion pivotally attached adjacent one of its ends to said stationary portions at a point spaced from the first mentioned point to provide a foldable extensible portion.

3. Apparatus for testing the continuity of an electrical circuit, comprising:

a hollow casing of insulating material, a pair of spaced metal contacts secured to an exterior surface of said casing for connection across said circuit to be tested, one of said contacts having a portion extending substantially perpendicular to said exterior surface of said casing and the other of said contacts having a portion which is pivotally attached to said surface of said casing for pivotal movement substantially parallel to said surface in order to vary the spacing between said pivotal contact portion and said perpendicular extending contact portion, means for connecting said pair of contacts to a source of electrical power, a pair of resistors positioned within said casing and connected between said pair of contacts and said connecting means, with one resistor connected to each of said contacts for limiting the current flow through each of said contacts, and an electric signal lamp positioned at least partially inside said casing so that the light emitted by said lamp is visible outside said casing, and electrically connected between one of said contacts and said connecting means in order to indicate when current flows between said contacts through said circuit being tested.

References Cited in the file of this patent
UNITED STATES PATENTS

| | | |
|---|---|---|
| 1,367,285 | Stimmel | Feb. 1, 1921 |
| 2,581,497 | Podell | Jan. 8, 1952 |